July 27, 1926. 1,593,871
L. T. GODFREY-EVANS
SUBMERGED TUNNEL COMBINED WITH MEANS AND METHOD OF LAYING THE SAME
FOR USE IN CONNECTION WITH RAILWAYS AND THE LIKE
Filed March 22, 1921 11 Sheets-Sheet 1
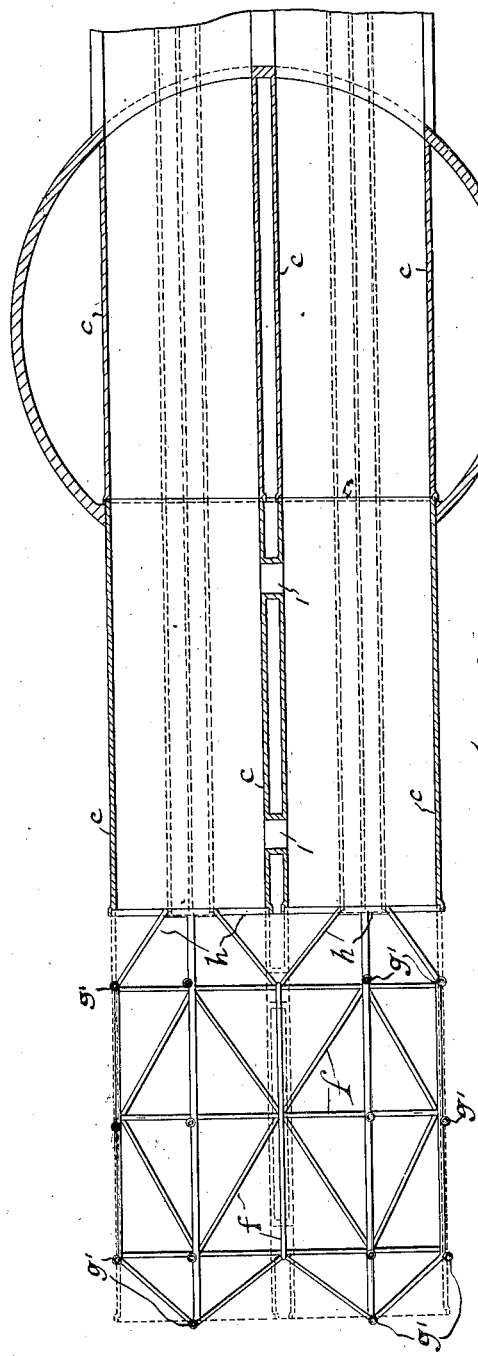
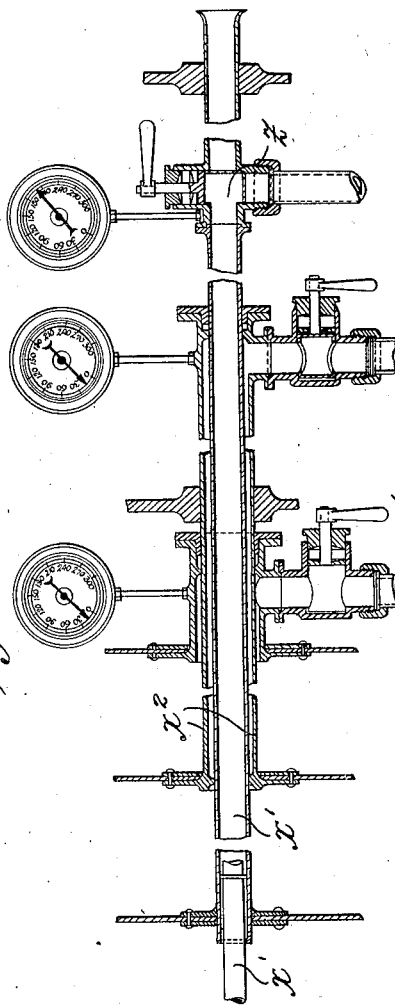
INVENTOR
L. T. GODFREY-EVANS
By
Atty.

July 27, 1926.
L. T. GODFREY-EVANS
1,593,871
SUBMERGED TUNNEL COMBINED WITH MEANS AND METHOD OF LAYING THE SAME
FOR USE IN CONNECTION WITH RAILWAYS AND THE LIKE
Filed March 22, 1921 11 Sheets-Sheet 2
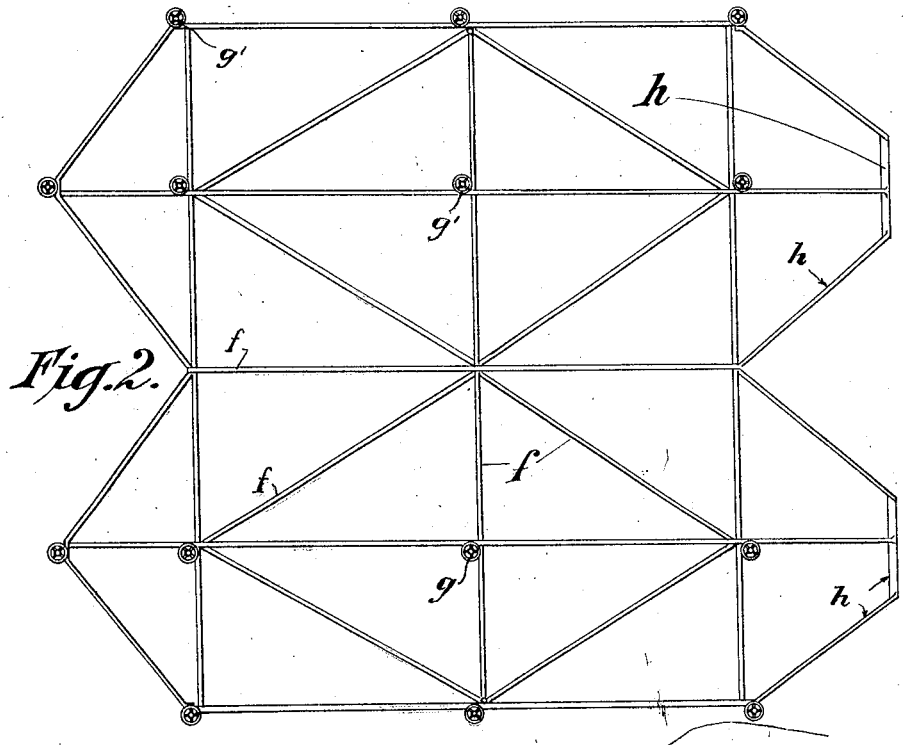
Fig.2.
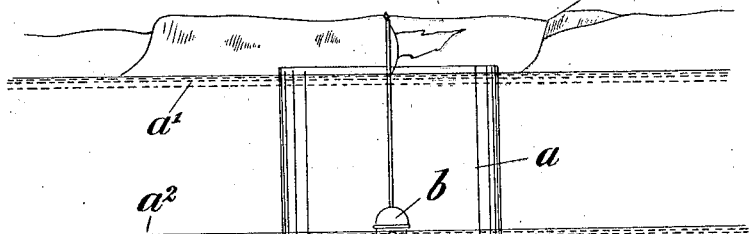
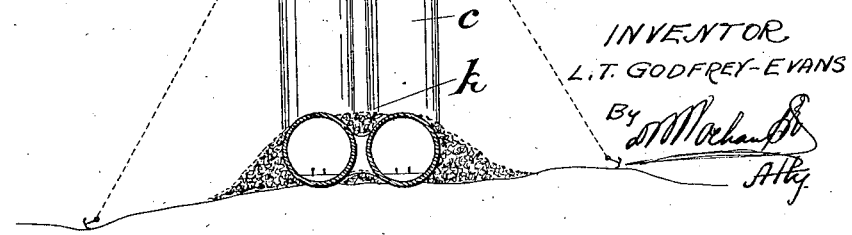
Fig.3.
INVENTOR
L. T. GODFREY-EVANS July 27, 1926.　　　　　　　　　　　　　　　　　　　1,593,871
L. T. GODFREY-EVANS
SUBMERGED TUNNEL COMBINED WITH MEANS AND METHOD OF LAYING THE SAME
FOR USE IN CONNECTION WITH RAILWAYS AND THE LIKE
Filed March 22, 1921　　　11 Sheets-Sheet 3
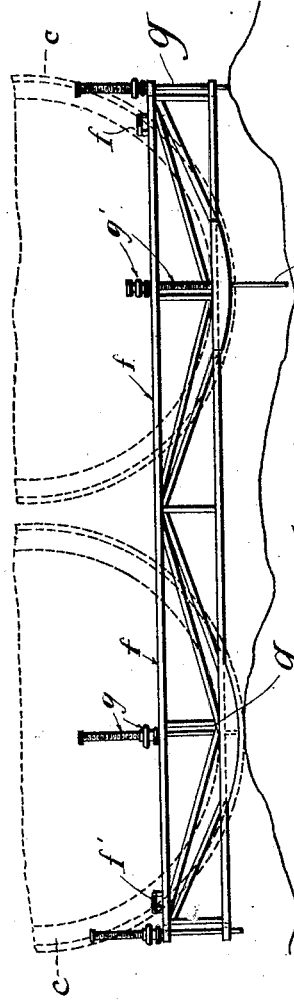
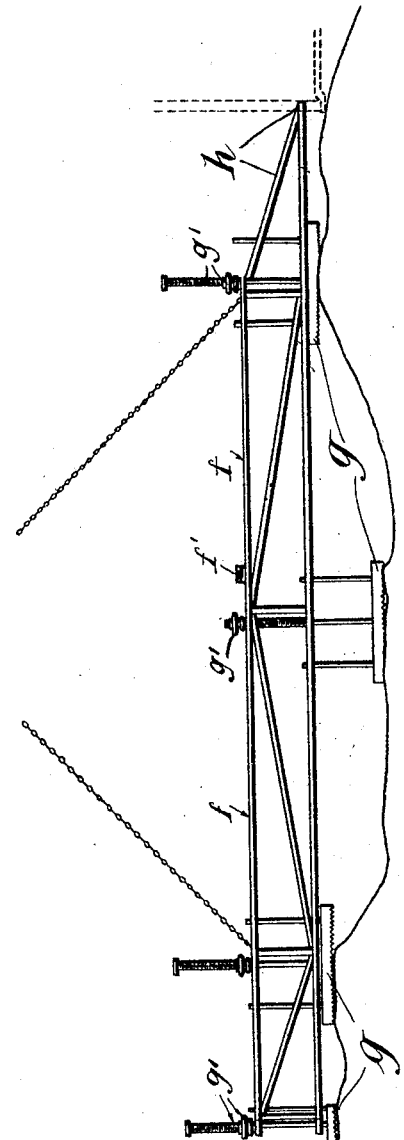
INVENTOR
L. T. GODFREY-EVANS July 27, 1926.                                                    1,593,871
                        L. T. GODFREY-EVANS
   SUBMERGED TUNNEL COMBINED WITH MEANS AND METHOD OF LAYING THE SAME
          FOR USE IN CONNECTION WITH RAILWAYS AND THE LIKE
                    Filed March 22, 1921        11 Sheets-Sheet 4
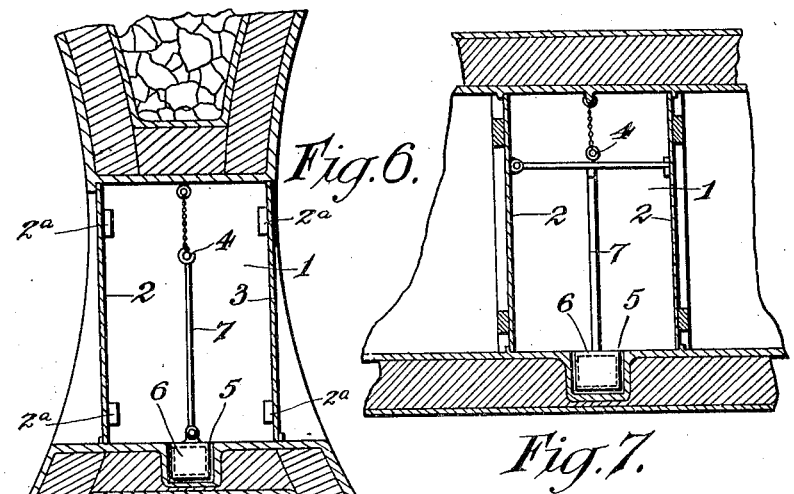
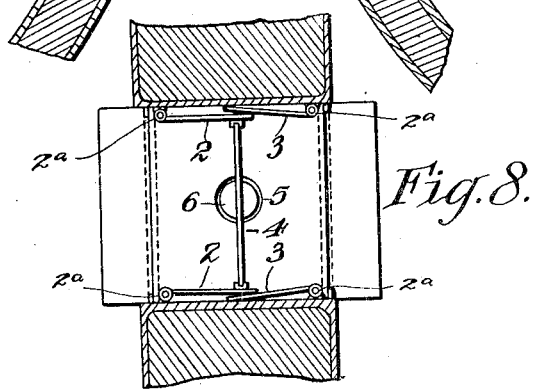
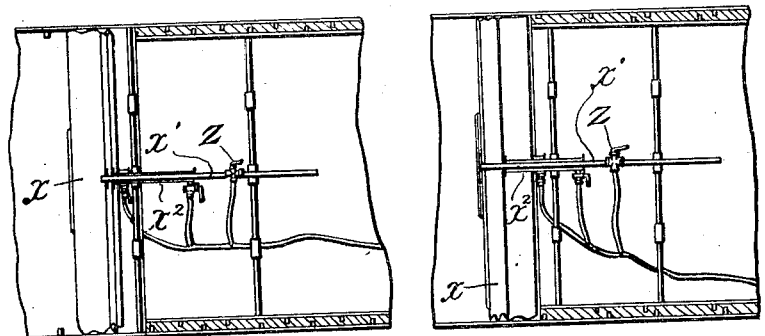
INVENTOR
L.T. GODFREY-EVANS July 27, 1926. 1,593,871
L. T. GODFREY-EVANS
SUBMERGED TUNNEL COMBINED WITH MEANS AND METHOD OF LAYING THE SAME
FOR USE IN CONNECTION WITH RAILWAYS AND THE LIKE
Filed March 22, 1921    11 Sheets-Sheet 5
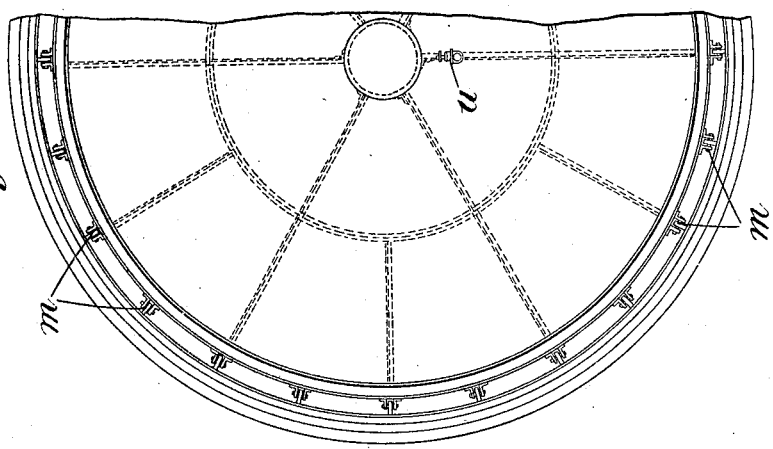
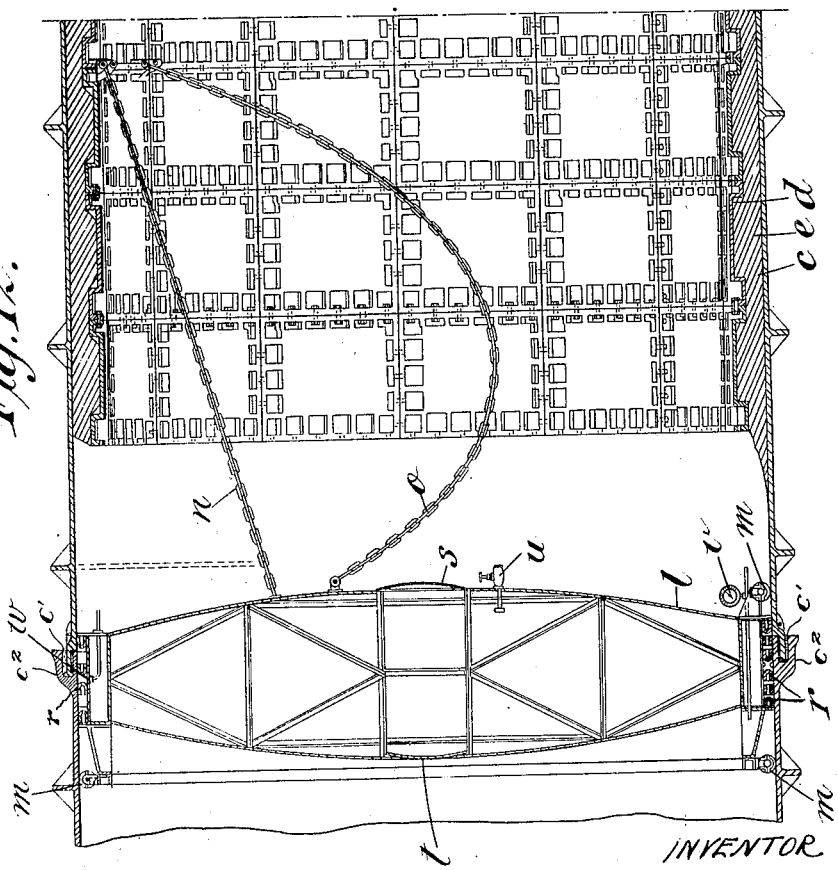

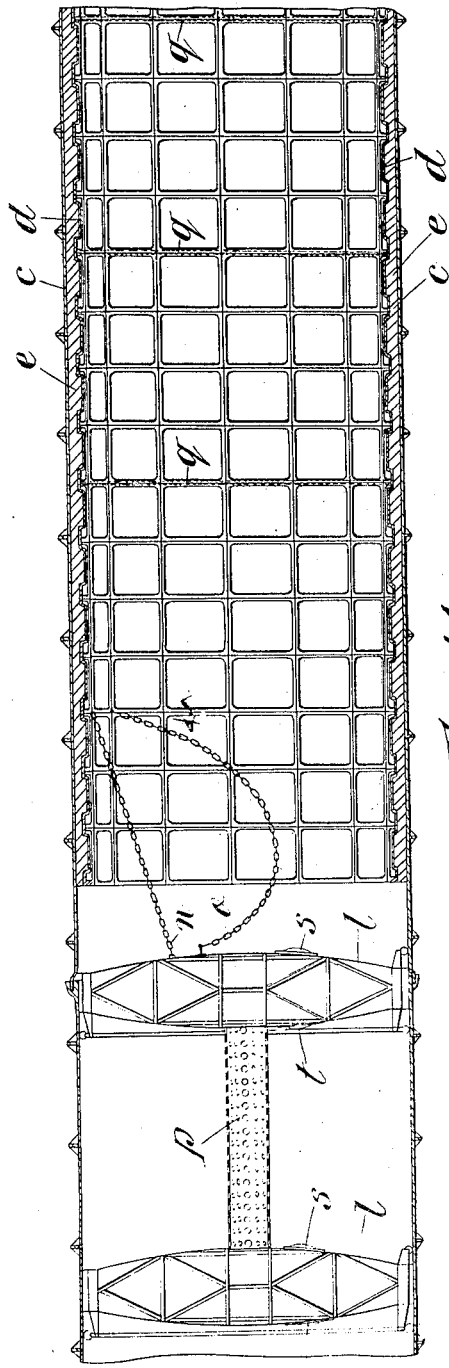
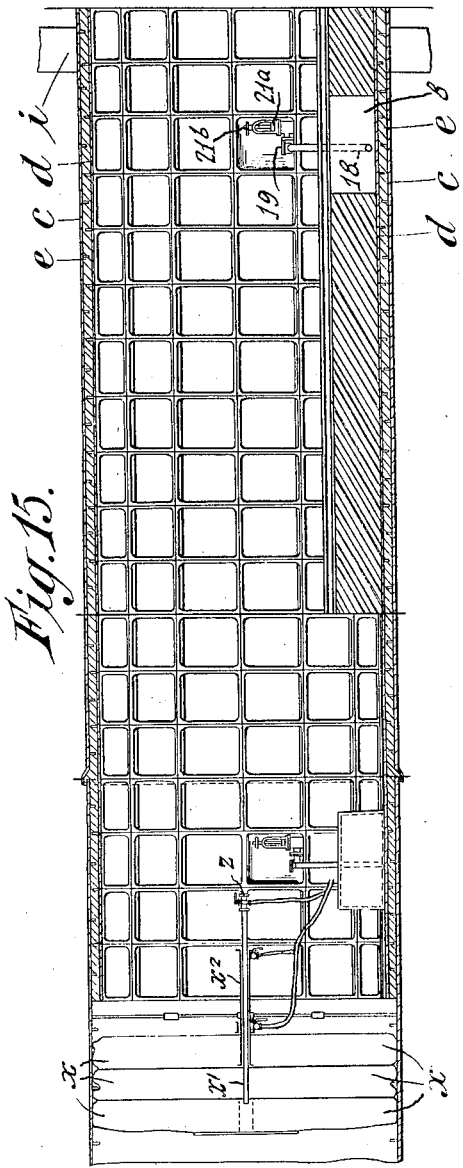

July 27, 1926.                                              1,593,871
                    L. T. GODFREY-EVANS
 SUBMERGED TUNNEL COMBINED WITH MEANS AND METHOD OF LAYING THE SAME
        FOR USE IN CONNECTION WITH RAILWAYS AND THE LIKE
                    Filed March 22, 1921         11 Sheets-Sheet 7

INVENTOR
L. T. GODFREY-EVANS
By

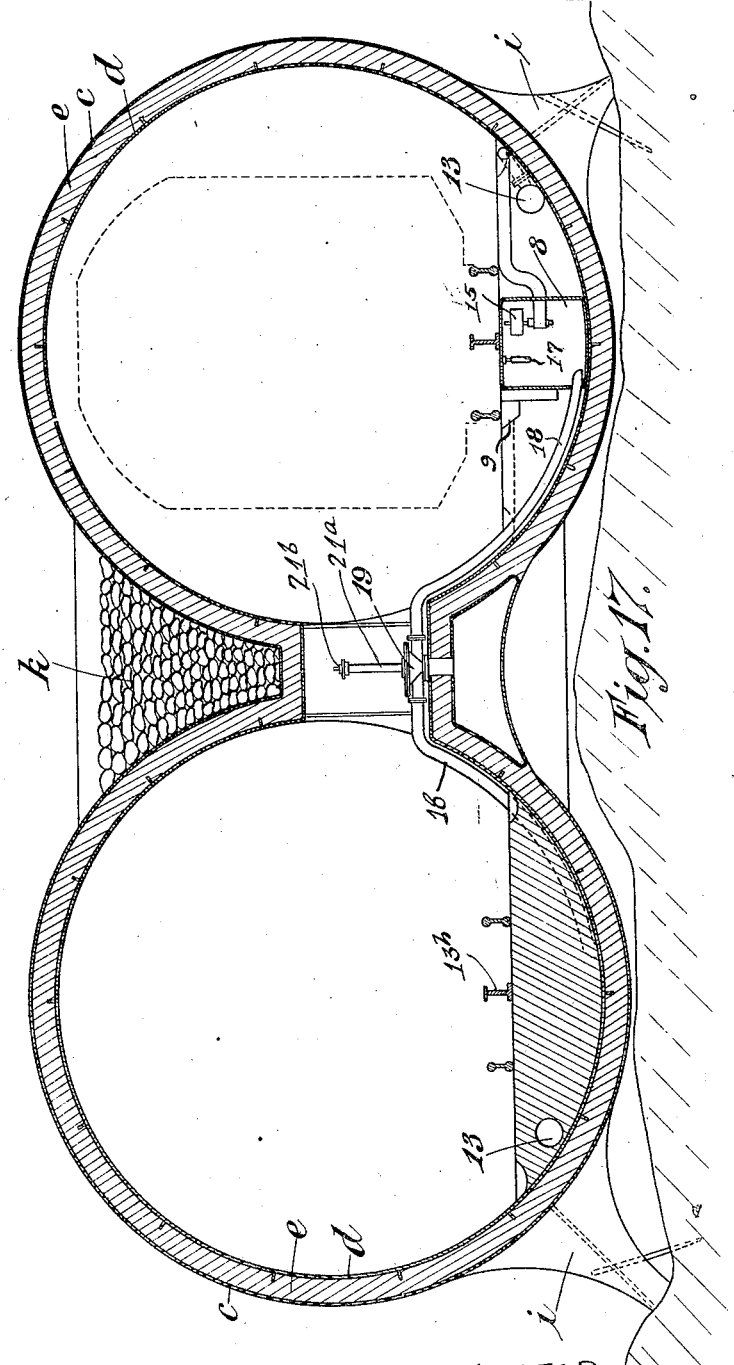

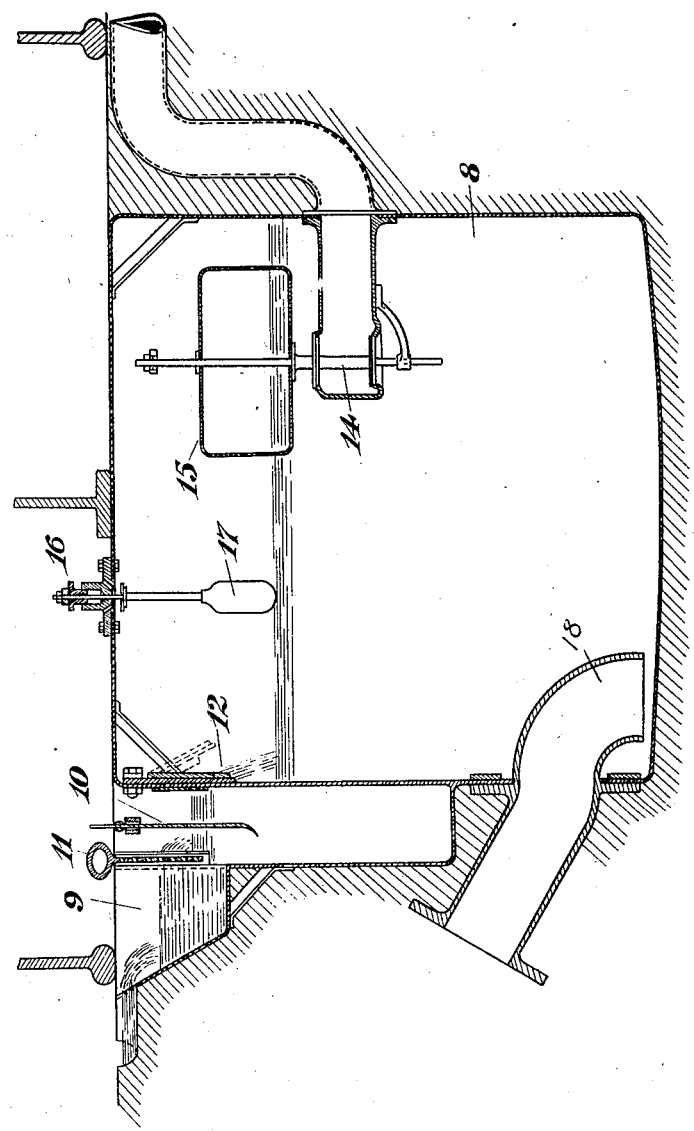

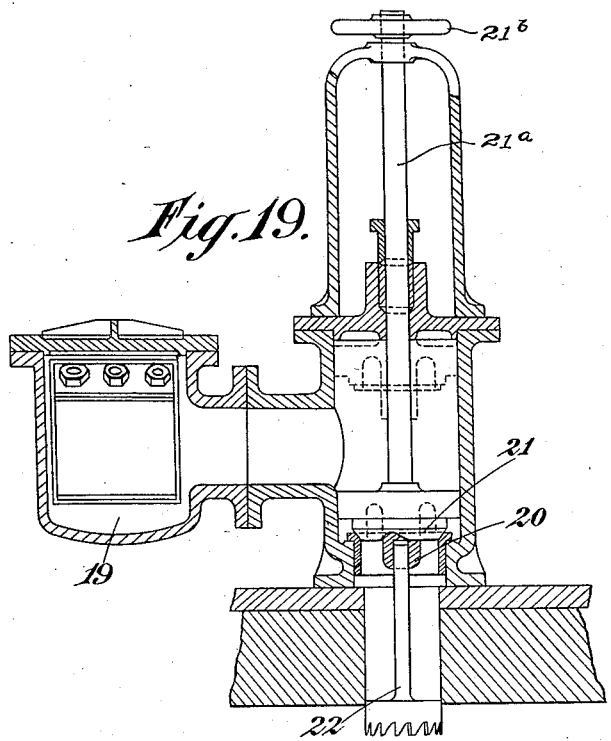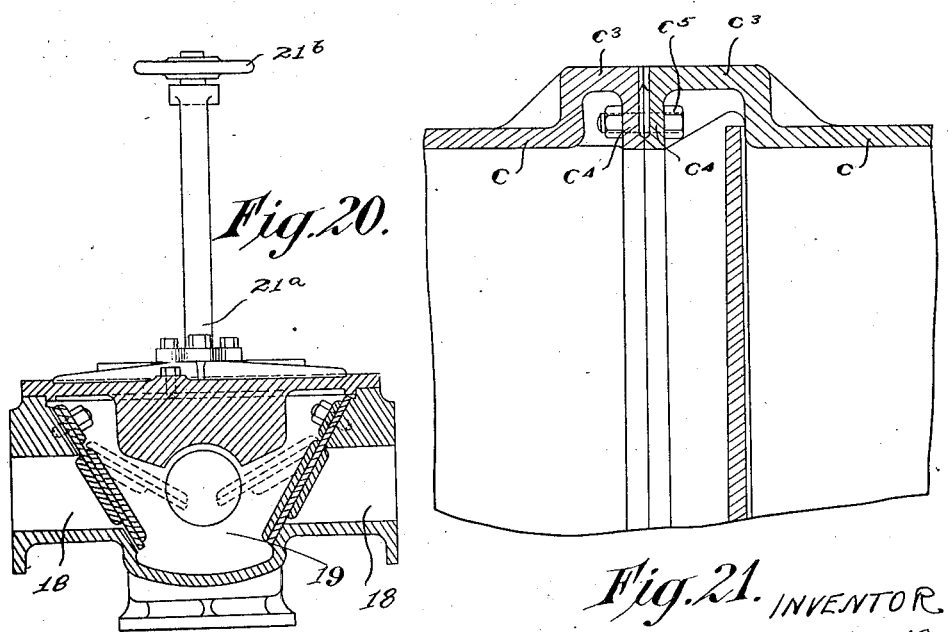

July 27, 1926.
L. T. GODFREY-EVANS
1,593,871
SUBMERGED TUNNEL COMBINED WITH MEANS AND METHOD OF LAYING THE SAME
FOR USE IN CONNECTION WITH RAILWAYS AND THE LIKE
Filed March 22, 1921   11 Sheets-Sheet 11
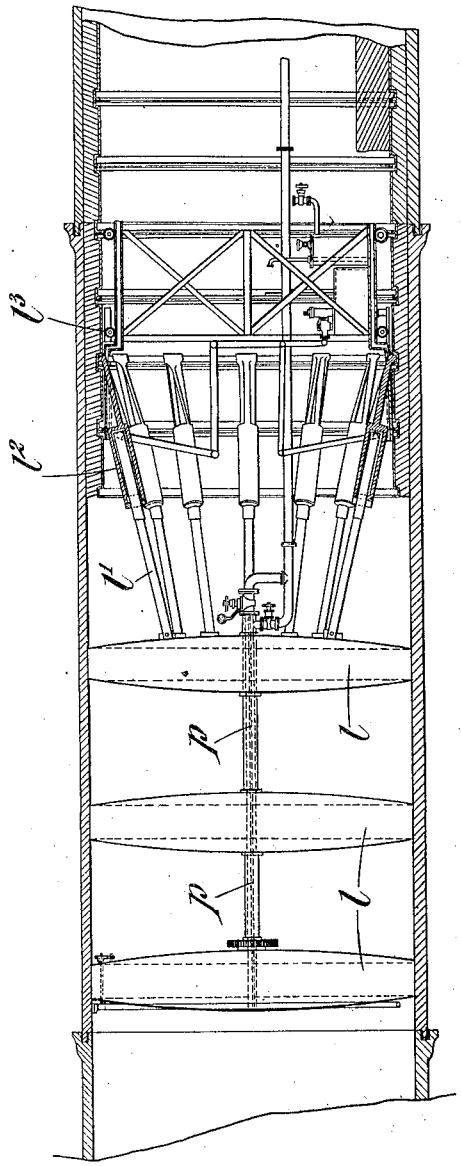
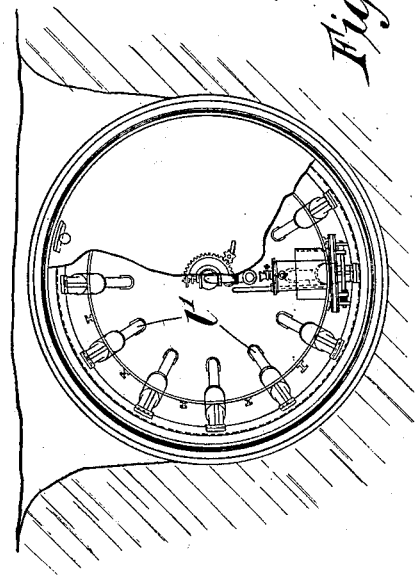
INVENTOR
L.T. GODFREY-EVANS Patented July 27, 1926.

1,593,871

UNITED STATES PATENT OFFICE.

LEWIS THOMAS GODFREY-EVANS, OF WEST NORWOOD, LONDON, ENGLAND.

SUBMERGED TUNNEL COMBINED WITH MEANS AND METHOD OF LAYING THE SAME FOR USE IN CONNECTION WITH RAILWAYS AND THE LIKE.

Application filed March 22, 1921, Serial No. 454,601, and in Great Britain February 21, 1921.

This invention relates to submerged tunnels of the kind which are constructed by the employment of preconstructed tunnel sections adapted to be sunk into and secured in the desired position, and to methods of laying the same.

The objects of the present invention relate to improvements in the methods of construction and assemblage adopted which will considerably facilitate the work of those employed, to provide improved means for drainage and ventilation and to facilitate intercommunication between adjacent tunnels.

The invention consists in a method of laying tunnels formed of preconstructed sections which are transported and lowered in place and which involves the embodiment of a movable bulkhead or abutment after the sections are in place, which bulkhead is adapted to be moved forward to expel the water from the tunnel as the work of laying the sections proceeds.

The invention also comprises other details and arrangements hereinafter described or indicated.

The accompanying drawings illustrate several modes of carrying the invention into effect.

Figure 1 is a plan view, partly in section, showing tunnel sections with a gauging or setting template arranged in advance of the foremost section.

Figure 2 is a somewhat enlarged plan of the template shown in Figure 1.

Figure 3 is a more or less diagrammatic view showing the shore end of the tunnel.

Figure 4 is a front elevation of the setting template shown in Figure 1.

Figure 5 is a side elevation.

Figures 6 and 7 are enlarged views showing the communicating doors between adjacent tunnels.

Figure 8 is a sectional plan of Figure 6.

Figure 9 is an enlarged section of a detail.

Figures 10 and 11 are views showing the method of operation of one form of movable abutment hereinafter referred to.

Figure 12 is a longitudinal section through the tunnel showing in detail one form of movable abutment that may be employed.

Figure 13 is a fragmentary end elevation of Figure 12.

Figure 14 is a similar view to Figure 12, showing a modified and preferred arrangement of abutment.

Figure 15 is a longitudinal section of a part of the tunnel showing convenient draining and ventilating arrangements and one form of abutment that may be used.

Figure 16 is a sectional plan of Figure 15.

Figure 17 is a transverse section through adjacent tunnels.

Figure 18 is a transverse sectional view of the drain tanks employed.

Figure 19 is a vertical sectional view of the valve used in connection with the drain tank shown in Figure 18.

Figure 20 is a similar view of the valve but taken on a line at right angles to that of Figure 19.

Figure 21 is a detailed sectional view showing the manner of uniting the meeting ends of the sections of the outer shell or casing.

Figures 22 and 23 are a longitudinal sectional elevation and a rear elevation (taken at two different points) showing a modification.

In carrying my invention into effect in one convenient manner when constructing a submarine tunnel, I provide upon each shore a caisson $a$ of suitable form and construction, as well understood in the art, and from each of which the operations may be carried forward. The caissons will be properly designed to suit the tides (high and low tides being shown at $a'$ and $a^2$ in Figure 3), and where required buoys $b$ of suitable form may be employed for indicating the line of direction of the sites of the two shore ends of the tunnel.

In the description which follows, it will be understood that a pair of adjacent tunnels is to be constructed, but it will be clear that the methods of procedure adopted in accordance with the invention may be equally applied with one or any number of tunnels.

Each tunnel preferably consists of an outer shell or casing $c$ of reinforced metal or may be reinforced concrete or other composite material adapted to surround an inner shell or casing $d$ formed of segmental or other plates of suitable material, the annular space between the shells or casings being filled in with any suitable filling material $e$. The outer shells or casings are constructed on land or in dry dock and are provided with spigot ends $c'$ and double-lipped socket ends $c^2$ for joining together, or, in the preferred mode of construction, the outer shells may be provided externally with spigots $c^3$ and sockets $c^4$ adapted to be drawn together for making the joint by through-bolts $c^5$.

In operation, the double-lipped sockets $c^2$ are filled with grouting or other like binding material prior to the sinking of the sections into their required positions.

In order to provide that the preconstructed sections may be accurately arranged in position, I employ a setting gauge or template $f$ which may be built up as a framework in any suitable manner and is provided with suitable fore and aft and lateral levels $f'$ and a suitable number of spaced and adjustable gauge feet or dogs $g$, carried upon the nut-operated screw shanks $g'$, the arrangement being such that by accurately adjusting the gauge feet, the gauge may be made to bed down upon the sea bottom while being accurately levelled by means of the levels, it being understood that, if necessary or desirable, any suitable excavation may be previously effected for the purpose of more nearly levelling the sea bottom. The gauge may be accurately set in relation to the previously laid tunnel section by means of a tapered fulcrum end $h$ adapted to be laid upon the invert or lip of such section, and when once the correct position of the gauge has been determined, it may be raised and landed on a suitable platform and is then positioned over a corresponding female setting gauge similarly constructed which is then adjusted to the positions of the dogs or gauge feet on the first mentioned setting template, which latter is then removed.

The outer shell of the next tunnel section is placed over the female setting gauge and the supporting arms or legs $i$ of the section are cut off to the various depths indicated by the setting template, so that when such outer shell is lowered into the water it will finally rest on its bed in the required position. The sections are held in place by ballasting which, for example, may be arranged between adjacent tunnels as shown at $k$ (Figure 17).

When one section has been thus laid, the next succeeding section may be gauged and laid in a similar manner, the sections being united together in the manner above indicated. The feet or supporting legs of the shells may also be suitably secured to the water bed.

For soft beds it will probably be sufficient merely to excavate a level and properly aligned trench into which the outer concrete shells are successively laid, thus dispensing with the setting gauges or templates.

It will be understood that the laying of the outer shells will be effected by divers, and in order to enable the interior work in the tunnels to be proceeded with simultaneously, I provide in the first laid section a movable abutment or bulkhead which is adapted to expel the water from such section and to be moved forward gradually as succeeding sections are laid and as the interior work proceeds, so that the latter may be carried out by ordinary workmen, while only the laying of the shells and the external work will have to be done by divers.

It will of course be understood that after the individual tunnel sections have been constructed on a dry site, they may be transported into position to be sunk by any well known available means and alined with the aid of divers. After the previously constructed sections have been accurately made through the use of the gauge or template $f$ the alining of the sections becomes a simple matter.

One convenient form of movable abutment is shown in Figure 12, and consists of a water-tight drum or piston $l$ provided on its outer circumference with supporting travelling wheels $m$ and temporarily secured within the section by means of taut and slack chains $n$, $o$, fitted to any suitable interior fittings within the tunnel. Under a suitable air pressure to prevent rearward displacement of the drum or piston, the water is forced out so that workmen can fit the segmental plates $d$ and composite or concrete packing within the outer shell as the piston or drum is progressively advanced through the continuous bores of the outer shells which are progressively laid in suitable alignment or position in the manner hereinbefore set forth. As the work advances within the outer shells, the taut chains securing the piston against the air pressure are gradually allowed to move forward with the piston or drum until the slack chains will take up the strain, this operation being repeated as the piston is moved forward by the air pressure, the chains being secured and released at intervals to internal flanges, rings or other fittings formed on or by the segmental plates which in turn form the inner tunnel, or other securing means may be employed.

In place of employing a single piston as shown in Figure 12, I may adopt the arrangement shown in Figure 14, where I have two pistons united together by a perforated rigid pipe or other connection $p$ so that I obtain between the pistons a body of compressed air, this arrangement having obvious advantages in operation as compared with the single piston above referred to.

The movable abutment of either Figure 12 or Figure 14 is progressively pushed forward by the air pressure from any suitable source being forced into suitable air locks formed in the rear of the abutment by means of detachable and built-up diaphragms $q$ secured at suitable intervals as shown in Figure 14. The diaphragms, which are secured in position by workmen, are provided with doors or other fittings or adjustments for conveyance of high pressure air to the advanced headings. The piston or drum is provided with suitable packing rings $r$, to prevent or minimize leakage of the head of water in one direction and of the air in the forward direction, the packing being similar in principle or action to the packing employed in hydraulic pistons or rams. Each of the pistons or drums is hollow and is provided with inner and outer manholes $s$, $t$ and air connection fittings for the divers so that they can gain access to the inside of the drum and then shut the inner manhole and proceed through the outer manhole into the open head of water for inspection or working purposes.

An emergency air valve $u$ is provided in communication with the interior of the piston so that the said interior may be subjected to air pressure as and when desired, and an air and water pressure gauge $v$ is also provided on the piston, as also lubrication means $w$ for the piston packing.

In an alternative arrangement of movable abutment, shown in Figures 9, 10, 11 and 15, I employ a system of two or more inflatable and collapsible balloons $x$ which are adapted to form pistons within the outer shells and are each connected independently by a corresponding series of telescopic high pressure air pipes $x'$, $x^2$ (Figure 9) which slide upon each other in such a manner that on deflating or collapsing the foremost balloon by suitable exhaust air valve $z$ (Figures 9 and 11) connected to the corresponding air pipe $x'$ for that particular balloon, the latter by means of its rearwardly extending air pipe may be pushed forward in the bore of the outer shell to the next suitable position and then inflated to form an air-tight piston or bulkhead. The rearmost balloon is then deflated or collapsed and by means of its corresponding air supply pipe $x^2$ is pushed forward to the then inflated balloon and also inflated, thus forming a piston in conjunction with the first balloon to keep the water out of the outer shell in which construction the operations are being carried on.

The manner of operating the balloons will be sufficiently clear from the foregoing description and from a consideration of Figures 9, 10 and 11, and the manner of bracing and supporting the balloons with bracing plates and flexible stays and the manner of supplying compressed air thereto and arranging the telescopic or other supply pipes may be suitably modified according to any particular practical requirements.

For the purpose of establishing communication between adjacent tunnels, I may provide any number of communicating passages 1 (Figures 6 to 8) and the doorways of such communicating passages are provided with a double pair of hinged doors 2, 3, the one pair of doors being spaced apart from the other pair and the doors being arranged so that they overlap one another when opened in the manner shown clearly in Figure 8. One pair of doors is provided near the top with a carrying bracket or recess adapted to receive a cross bar 4 which when in position is adapted to normally secure each pair of doors in the open position against the action of spring hinges $2^a$ tending to close the doors. In the passage or doorway or in any other convenient position there is provided a well 5 adapted to receive a float 6 having fixed or pivotally connected to its upper end an upright tripping bar 7, which latter, at its upper end, is adapted to engage the cross bar 4, the construction, arrangement and mode of operation being such that in case the tunnel to which such water-tight doors are fitted becomes flooded with water the latter will find its way into the well 5, thus causing the float to rise and with it the tripping bar 7 which in turn disengages the cross-bar 4 from the securing brackets or recesses on one pair of doors so that the latter are released and by the action of the closing springs and of the inflowing water behind either pair of doors in either direction, the one pair of doors which has obtained the initial start by means of the closing springs is finally closed by the inflow of water and the flow of water through such doors is thereby effectually prevented.

With the object of securing adequate draining arrangements for the tunnels, I provide at intervals along the tunnels and under the permanent way thereof a series of water-tight drain tanks 8 as shown in Figures 17 and 18 having adjacent thereto corresponding water traps 9 each provided with a baffle plate 10, a perforated plate 11 and a reflex or non-return valve 12 leading into the tank. Upper drains at either side of the tunnel lead unto the water traps from which the water is discharged into the drain tanks along the permanent way. Along the side of each tunnel there is provided a high pressure air supply pipe 13 connected by branch pipes to each drain tank by means of a valve fitting 14 within the tank and having a weighted float 15 adapted to raise the valves 14 off their seats as the accumulating water in the drain tank raises the float.

At the top of the drain tank there is a valve 16 adapted to close or open corresponding air vents through the action of the float 17 and at the bottom of each drain tank is a discharge pipe 18 leading into a reflex or non-return valve 19 (shown in detail in Figure 20) which in turn is connected to an emergency valve 21 operated by rod 21ª and wheel 21ᵇ (which is shown in detail in Figure 19). When it is desired to force water out of the traps 8 the valve 20—21 is manually unseated by manipulating the rod 21ª through the wheel 21ᵇ to thereby establish communication between the discharge pipe and the outer body of water. With reference to the manner in which the emergency valve is installed it may be pointed out that the central boss 20 on the valve 21 is fitted with a detachable cutter 22 of suitable form which when the valve casing is bolted to the inner tunnel casing is utilized to cut a hole completely through the tunnel wall, whereupon the cutter will become detached and the valve will be in direct communication with the water outside the tunnel. At convenient positions along the tunnel air release valves of any suitable type are connected to the high pressure air supply pipe 13 and at predetermined intervals and before a moving train reaches any air supply release valve the latter are adapted to be opened and closed by the application of any suitable mechanical or electrical means or by clockwork or pneumatic or hydraulic means.

The arrangement of such is that as drain water drains into the tanks 8 the water on rising therein eventually closes the valve 16 and in succession the weighted float 15 raises the valves 14 off their seats so that any air pressure already generated in the drain tank by the action of the rising water is reinforced by the air pressure from the high pressure air supply pipe 13 in such a manner that the water accumulated within the tank 8 is forced through the corresponding discharge pipe 18, reflex or non-return valve 19 and then through the emergency valve 21 into the exterior body or head of water.

In addition to thus providing an adequate draining means for the tunnels, the same may be efficiently ventilated by means of the compressed air which is used for flushing the drain tanks.

An important modification of the invention is illustrated in Figures 22 and 23, as by the use of such modification or by the use of the other forms similarly arranged and modified, it is possible to lay submerged tunnels in any depth of water in such a manner that when so laid, ordinary workmen shall be able to carry on all operations for a completely equipped tunnel at an air pressure no greater than that of the atmosphere. This arrangement is the reverse of that usually adopted, wherein the pressure at the working face is sufficiently high to withstand the pressure head of any water or quicksand and the pressure is gradually reduced by the provision of successive air locks proceeding away from the face.

In the form shown in Figures 22 and 23 I provide three pistons $l$ similar to those previously described and connected in pairs by the perforated pipes or the like $p$, the pistons thus forming two chambers within which is air under pressure and movement of the system by pistons under the influence of the pressure head at the working face is prevented by any suitable form of stays or abutments situated behind the rearmost piston. For example, the latter may be supported by a number of hydraulic or other fluid pressure operated rams $l'$ working in hydraulic cylinders $l^2$ carried by a framework mounted upon and adapted to be moved by a suitably arranged portable carriage or carriages $l^3$ which are fastened temporarily to any part of the cast iron rim or flange of the inner casing ring whilst the rams $l'$ act on the face of the rear piston with a total force equal at least to the total force due to the hydrostatic or other pressure head acting on the face of the leading abutment.

On increasing the working pressure on the rams by means of an electrically actuated or other suitable hydraulic pump or other means the piston system will be advanced with more or less speed as the working pressure is increased. The whole series of rams act accordingly to force forward the piston system along the outer casing for a distance equal to the stroke of the rams when preparations are at once proceeded with for the next advance by separately and consecutively detaching in turn each hydraulic cylinder and sliding same along its guide projecting from the supporting framework until it reaches and is inserted into the next advanced recess formed by the ring flanges of the tunnel and so on for each of the remaining cylinders whereby the portable carriage is pushed forward and secured so that the whole will be ready for the next advance. In the meantime the workmen proceed to fix the next ring of segmental cast iron plates, bolt up, and grout with cement the annular space between the inner and outer shells. With such an arrangement permitting the workmen to work under normal conditions the air locks in rear of the workmen may be provided but in this case they will be required for emergency purposes only.

It will be clear that such a system of hydraulic or other stays or abutments may be employed with any number of pistons or with any other of the forms of apparatus hereinbefore described, it being noted that the number of pistons or abutments will in general be determined by the depth at which the tunnel is to be laid, as, for example, when tunnelling under the English Channel the number of pistons or abutments would probably be less than that required for tunnelling across the Irish Sea owing to the greater depth of the latter as compared with the English Channel.

It is to be understood that the invention is not to be limited to the foregoing details of construction which are given by way of illustration only, as the invention is broadly applicable to the construction of any subaqueous or submerged tunnel and the number, size and mode of construction of the tunnels, the means adopted for ventilating and draining the same and for establishing intercommunication between the tunnels, and the materials employed in the construction of the various parts as also the means adopted for securing successive sections together and for locking and holding the same in position, may all be variously modified as may be found necessary or desirable having regard to any practical requirements that may have to be fulfilled.

I claim:—

1. A method of laying submerged tunnels which consists in determining the character of the sea bottom by sinking gauges which may be adjusted to support the body of the gauge in a level position, next carrying the gauges to a dry site and positioning the same over a corresponding female setting gauge, then placing the outer shell of the tunnel section to be formed over the female setting gauge and constructing the same with supporting arms or legs which may be cut off to the depth indicated by the setting gauge, and subsequently floating the preconstructed section to position and sinking the same to rest on the sea bed.

2. A bulkhead unit for submerged tunnel constructions consisting of a water tight piston provided on its outer circumference with supporting traveling wheels, and a pair of taut and slack chains connected to the piston and anchored within the tunnel.

3. A submerged tunnel construction provided at intervals along the tunnel with a series of water tight drain tanks, water traps adjacent the tanks, a non-return valve for said trap, air supply pipes communicating with each drain tank, and a discharge pipe including a non-return valve communicating with the bottom of the drain tank, whereby water accumulating therein may be expelled outside of the tunnel by air pressure.

In testimony whereof I have affixed my signature hereto this 2nd day of March, 1921.

LEWIS THOMAS GODFREY-EVANS.